ns
3,203,683
CUTTING TORCH APPARATUS
Hans Philipp Emmerich Weiler, Hofheim, Taunus, Germany, assignor to Messer Griesheim G.m.b.H., Frankfurt am Main, Germany
Filed Jan. 30, 1963, Ser. No. 254,950
Claims priority, application Germany, Feb. 2, 1962, K 45,812
9 Claims. (Cl. 266—23)

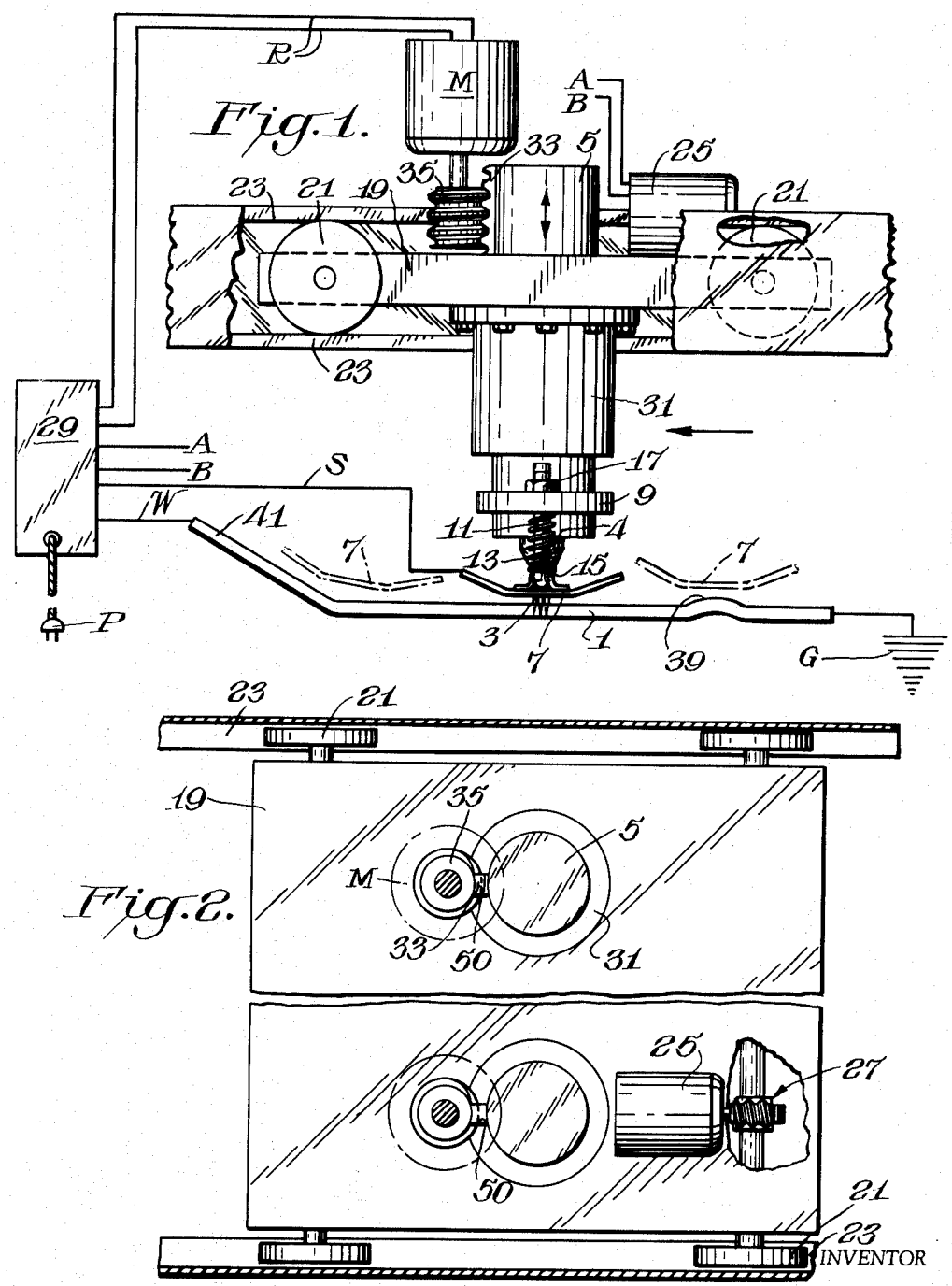

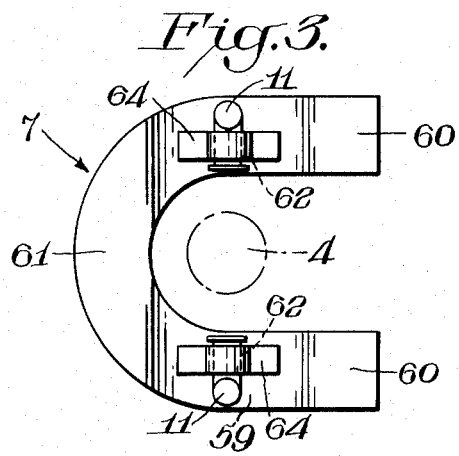
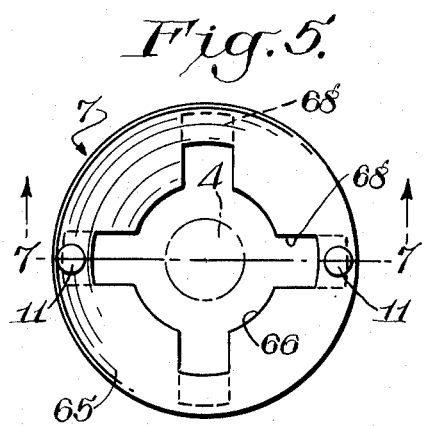
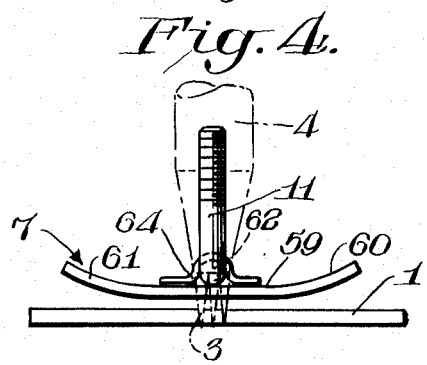
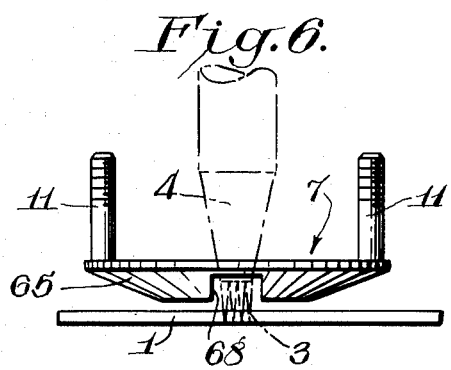
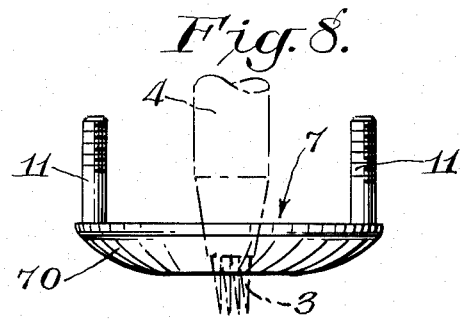
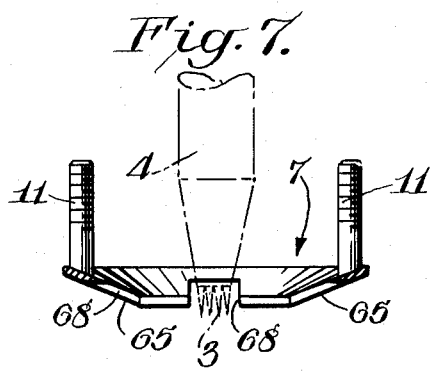
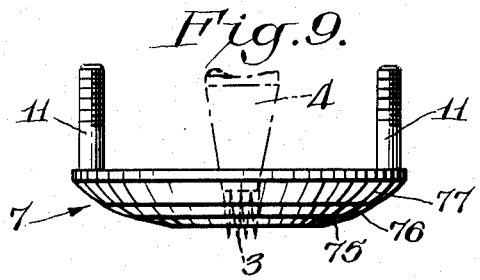

The present invention relates to cutting torch apparatus which may be of the acetylene type wherein the torch is supported on a driven carrier for moving the torch across and above a work piece being cut. In particular, the invention relates to a torch cutter assembly wherein the torch is maintained at a uniform height above the work piece surface regardless of raised or inclined areas on the surface of said work piece, for example a steel sheet.

One known form of an automatically operating device for maintaining the height of the torch nozzle uniform above the surface of the work piece includes a height registration shoe which is supported by the torch, thus moving with the shoe, and takes the form of a ring or is U-shaped. The shoe surrounds the nozzle end to lie substantially in a horizontal plane (parallel to work piece) and is spaced from the nozzle itself. The shoe is electrically insulated with respect to the nozzle and forms one of the electrodes of an electrical capacitor. The grounded work pieces constitute the second electrode, and the air between the two electrodes constitutes the dielectric. The electrodes are connected with an electrical automatic adjusting device which operates a torch raising and lowering means. When the spacing varies between the height detector shoe and the work piece surface, the adjusting means raises or lowers the torch as required to maintain the desired uniform spacing or height of the nozzle above the work piece surface.

With this known device, when the feeler shoe contacts the work piece surface or is in some other manner brought into contact with the surface of the grounded work piece, the torch is raised which in turn raises the shoe. Normally, the shoe hovers above the work piece in a definite electrically adjustable approximately uniform spacing. In case this spacing is lessened for any reason, for example, when the shoe and torch carried by a suitable advancing carriage arrive over an elevated portion of the upper surface of the work piece, then the shoe is raised by means of the electrical automatically operating device until the desired spacing between the shoe and the upper surface of the work piece at that particular point is attained. The automatic device reacts in a reverse manner to lower the shoe and torch in case the spacing is increased. The desired position of the shoe and torch above the work piece is set up initially before starting the cutting operation through a manual adjustment. This spacing will vary according to the material being cut and the thickness thereof.

A known shoe of this type has the form of a large letter U and consists of a flat (level) plate. A shoe of this type has been found satisfactory for cutting plates only which have very slightly inclined level or slightly raised surface portions. However, for cutting pieces having substantially inclined areas and/or raised areas, a fixed (rigid) horizontally arranged level shoe is no longer useful. Such a shoe when moved over the work piece will strike against the raised areas or inclined portions with one edge and will be raised. Such edge contact is all the more likely, the greater the angle is between the horizontal shoe and the arched or inclined surface of the work piece. Since the equilibrium point of the shoe lies lower than the point at which the shoe strikes the work piece, there results a continuous touching, raising, lowering, touching, etc. By reason of this continuous up and down movement of the shoe with the torch secured thereto, the adjusting motor and the electrical contact device are subjected to particularly hard wear.

In order to avoid the drawbacks of this fixed horizontal shoe, it has already been proposed to make it pivotal about a horizontal axis, so that it can be adjusted in each case to the inclination of the upper surface of the work piece against the horizontal. When cutting work pieces whose surface characteristics change continually and are relatively extreme, it is necessary in such case, however, to have a continual adjustment of the inclined position of the shoe. Furthermore, the advantages of such a shoe can only be realized if the horizontal direction of movement of the torch occurs about rectangular to the axis of inclination of the shoe.

In accordance with the present invention, there is provided a height registering shoe wherein the surface of the shoe facing the surface of the work piece is curved rather than being flat or straight. This shoe can take the form of a U-shaped member with the opposite ends thereof arched upwardly and the middle portion being straight. The U-shaped member lies substantially in a horizontal plane with respect to the work piece surface during operation. Also, it can take a frustro spherical or frustro conical shape with a vertical axis or may be composed of several frustro spherical and/or frustro conical parts. By means of such a shape of the surface of the shoe facing the surface of the work piece, it is possible to obtain a substantially uniform height of the cutting nozzle above all areas of the work piece as the torch moves across the work piece. The inclination of the shoe need not be adjusted regardless of how sharply the inclination or arching of the upper surface of the work piece may be.

Other objects and advantages of the invention will become more apparent from a study of the following description and drawings wherein:

FIGURE 1 is a side view of the torch cutter assembly;

FIGURE 2 is a top view of the apparatus of FIGURE 1;

FIGURE 3 is a top view of one embodiment of a height registering shoe of the present invention;

FIGURE 4 is a side view of the shoe of FIGURE 3;

FIGURE 5 is a top view of another embodiment of the registering shoe;

FIGURE 6 is a side view of the shoe of FIGURE 5;

FIGURE 7 is a section taken along line 7—7 of FIGURE 5;

FIGURE 8 is a side view of still another embodiment of the height detecting shoe; and FIGURE 9 is a side view of a further embodiment of the height detecting shoe of the present invention.

As shown in FIGURE 1, a work piece 1 to be cut by an oxygen stream (not shown) issuing from the nozzle 4 of the torch 5 and preheated by the flames 3 is grounded at G. The height detecting shoe 7 (to be described in detail hereinafter) is supported by a flange 9 secured around and electrically insulated (not shown) against the torch 5. As seen, bolts 11 (one not shown) secured to the shoe connect it with the flange 9. A compression spring 13 is supported around the bolts 11 and operates between the lower surface of flange 9 and retaining ring 15 to urge the shoe in a downward direction. An adjusting nut 17 holds the bolt in place. With this arrangement, the spacing of the shoe 7 above the work piece 1 can be adjusted by lowering the nut 17 on the bolts 11 to raise the bolts and the shoe 7 connected thereto. The spring 13 maintains the shoe 7 in a substantially fixed position but will give the shoe free motion in the upwards direction should the shoe for some reason strike a sharp rise or incline on the work piece surface to prevent damage to the shoe assembly. As mentioned above, more will be said below about the specific form of the shoe 7 and its mounting arrangement on the bolts 11.

A carriage 19 supported on wheels 21, also shown in FIGURE 2, supports the torch and moves it in a horizontal direction over the work piece surface. The wheels 21 travel in tracks 23 supported in stationary manner. One set of wheels 21 is driven by motor 25 through a worm gear and shaft arrangement generally identified as 27 in FIGURE 2. The motor 25 is powered by leads A, B leading from power source and automatic electrical adjusting device 29 (see FIGURE 1).

As further shown in FIGURES 1 and 2, the torch 5 can move vertically within sleeve 31 fixed to the carriage 19. The torch 5 is supported by a gear rack 33 which cooperates with a worm gear 35 driven by reversible motor M which is supported in a suitable manner on the carriage 19. The reversible motor M is electrically connected with power source and automatic electrical adjusting device 29 by leads R, R.

The shoe 7 is also connected with the power source and automatic electrical adjusting device 29 by lead S and the work piece is connected to the power source and automatic electrical adjusting device 29 by lead W. Device 29 is connected by plug P to a primary electrical source not shown. As mentioned in connection with the prior art, the shoe 7 and the work piece 1 act as electrodes which form an electrical capacitor, the air between the electrodes serving as the dielectric.

FIGURE 2 is a top view and shows how a plurality of torches can be operated in the above-described manner in case spaced parallel cutting is desired. Also, it is seen in FIGURE 2 that the rack 33 is guided in a corresponding slot 50 in the lower portion of sleeve 31 to prevent the torch from rotating during the operation of worm gear 35.

In operation, when the undersurface of the shoe 7 approaches a raised portion area in the work piece surface, such as at 39, or an inclined area 41, the capacitance in the electrodes (work piece and shoe) changes thereby sending a signal to the power source and automatic electrical adjusting device 29. A correction is made in the adjuster means and a corresponding signal is passed to the reversible motor M which will operate the worm gear to raise the torch 5 and shoe 7. By this movement, a uniform height is maintained by the torch nozzle above the work piece surface. After the torch has moved over the raised area 39 or inclined area 41, the capacitance again changes since the shoe 7 is located at a greater height above the work piece surface 1. The signaling action described above is then repeated and the motor M rotates the worm gear 35 in the opposite direction to lower the nozzle 4 to the required distance to maintain the nozzle at the desired height above the work piece surface. By this arrangement, a uniform height is maintained by the nozzle of the torch above all areas of the work piece whether high or low.

The above arrangement for driving the carriage and for raising and lowering the torch is only one arrangement among many which can be used. Other suitable and known driving arrangements are contemplated in the present invention.

FIGURES 3 and 4 show the height registering shoe 7 of FIGURES 1 and 2. The shoe is U-shaped having a straight or flat middle portion 59 but with the opposite end portions arching upwardly as at 60, 61 from the flat middle portion. As seen, the bolts 11 terminate at their lower ends in a horizontal stub shaft 62 which shafts are connected in pivotal manner to the shoe 7 by brackets 64. With this arrangement, the shoe can pivot vertically if for some reason, such as a sharp extreme high point, the shoe should strike the work piece surface. Also, the torch can be moved in any direction since it maintains its vertical position nearly independently of any pivoting of the shoe 7.

FIGURES 5-7 show a ring-type shoe with bolts 11, 11 welded thereto. The circumferential area of the shoe assumes a conical shape as at 65 to provide a frustro conical surface on the shoe. The nozzle 4 extends into the ring aperture 66 which is electrically insulated from the torch. Cut outs 68 permit one to observe the preheat-flames during the operation.

FIGURE 8 shows a ring-type shoe 7 which has a circumferential area of spherical shape 70 to form a frustro spherical surface on the shoe.

FIGURE 9 shows a ring-shaped shoe having a circumferential area formed of three different conical portions 75, 76 and 77 which on projection project outwardly along different lines to one another.

Other modifications are possible within the scope of the above description and the appending claims.

What is claimed is:

1. In a torch cutting apparatus comprising a torch, means for moving said torch across and above a work piece to be cut, means for raising and lowering said torch as it moves across said work piece, a height registering shoe supported by said torch and spaced from said work piece surface, and automatic adjusting means connecting said shoe and work piece with said torch raising and lowering means for maintaining a uniform spacing between said nozzle and said work piece surface regardless of high and low areas in said work piece surface over which said torch is moved, the improvement being the portion of the shoe directed to the work piece surface has upwardly curved portions on the outer edge of the shoe, corresponding to the direction of movement of the torch.

2. The apparatus of claim 1 wherein the shoe is U-shaped and has a straight middle section with upwardly curved opposite ends, said torch extending vertically into the area defined by said U.

3. The apparatus of claim 2 wherein the shoe is pivotally supported on said torch to pivot vertically with respect to said work piece surface.

4. The apparatus of claim 1 wherein the shoe is ring-shaped having a frustro conical lower surface, said torch extending vertically into the open center of said ring.

5. The apparatus of claim 4 wherein flame observation cut outs extend from the inner ring edge outwardly toward the outer ring edge.

6. The apparatus of claim 1 wherein the shoe is ring-shaped and has a frustro spherical lower surface facing the workpiece, said torch extending vertically within the open center of said ring.

7. The apparatus of claim 1 wherein the shoe is of ring shape and has a lower surface of frustro conical shape formed of a plurality of different conical portions which project on different lines to one another.

8. A torch cutting apparatus comprising a torch, means for moving said torch across and above a work piece to be cut, means for raising and lowering said torch as it moves across said work piece, a flange around and electrically insulated against said torch, a height registering shoe, having upwardly curved outer marginal portions, directed to the work piece surface, bolts extending from said shoe which extend upwardly through said flange to support the shoe at a spaced distance above said work piece, an adjusting nut on said bolts for adjusting the spaced distance of said shoe above said work piece surface, and automatic adjusting means connecting said shoe and work piece with said torch raising and lowering means for maintaining a uniform spacing between said torch and said work piece regardless of high and low areas in said work piece surface over which said torch moves.

9. Apparatus according to claim 8 wherein a compression spring is supported around each bolt to urge the shoe downwardly.

No references cited.

MORRIS O. WOLK, *Primary Examiner.*
JAMES H. TAYMAN, JR., *Examiner.*